United States Patent [19]
Yang et al.

[11] Patent Number: 6,097,866
[45] Date of Patent: Aug. 1, 2000

[54] OPTICAL FIBER RIBBON

[75] Inventors: Houching M. Yang, Conover; Alfred L. Hinson, Hickory; Richard T. Robinson, Newton, all of N.C.

[73] Assignee: Alcatel, Paris, France

[21] Appl. No.: 09/071,641

[22] Filed: May 1, 1998

[51] Int. Cl.[7] ................................................ G02B 6/44
[52] U.S. Cl. ............................................................ 385/114
[58] Field of Search ......................... 385/114; 174/117 F

[56] References Cited

U.S. PATENT DOCUMENTS

| | | | |
|---|---|---|---|
| 2,528,667 | 11/1950 | Raabe | 174/117 F |
| 4,401,361 | 8/1983 | Slaughter | 385/114 |
| 4,847,443 | 7/1989 | Basconi | 174/32 |
| 4,900,126 | 2/1990 | Jackson et al. | 385/114 |
| 5,166,998 | 11/1992 | Patel | 385/114 |
| 5,212,756 | 5/1993 | Eoll | 385/114 |
| 5,369,720 | 11/1994 | Parry et al. | 385/114 |
| 5,460,683 | 10/1995 | Beasley, Jr. et al. | 156/344 |
| 5,561,730 | 10/1996 | Lochkovic et al. | 385/114 |
| 5,643,393 | 7/1997 | Genovese et al. | 156/344 |
| 5,673,352 | 9/1997 | Bauer et al. | 385/114 |
| 5,802,231 | 9/1998 | Nagano et al. | 385/114 |

FOREIGN PATENT DOCUMENTS

| | | |
|---|---|---|
| 99400981 | of 0000 | European Pat. Off. . |
| 0647866 | 4/1995 | European Pat. Off. . |
| 0749129 | 12/1996 | European Pat. Off. . |
| 0813084 | 12/1997 | European Pat. Off. . |
| 2026718 | 2/1980 | United Kingdom . |
| 2187306 | 9/1987 | United Kingdom . |
| 2215084 | 9/1989 | United Kingdom . |

OTHER PUBLICATIONS

European Search Report dated Aug. 3, 1999 (2 pages).

*Primary Examiner*—John D. Lee
*Assistant Examiner*—Michael J. Stahl
*Attorney, Agent, or Firm*—Ware, Fressola, Van der Sluys & Adolphson LLP

[57] ABSTRACT

An optical fiber ribbon is disclosed. The optical fiber ribbon comprises a plurality of optical fibers arranged in a parallel planar array, the planar array being further defined by first and second planar sides spanning between first and second ends. A matrix material coating envelops the optical fibers so as to bond the optical fibers together in the parallel planar array. The matrix material coating forms a first substantially planar surface section spanning the first planar side of the planar array of optical fibers. A second substantially planar surface section spans the second planar side of the planar array of optical fibers. A first hinge section bridges the first and second substantially planar surface sections at the first end of the planar array and a second hinge section bridges the first and second substantially planar surface sections at the second end of the planar array. At least one of first hinge sections has a surface portion which extends outwardly normal to and beyond at least one of the planes defined by either the first or second planar surface sections of the matrix material coating. The shapes of the hinge sections enable them to be removed without special tools and enable the ribbons to be stacked. Removal of the hinged sections enables access to the optical fibers without special tools by compromising the structural integrity of the matrix material coating.

31 Claims, 4 Drawing Sheets

OPTICAL FIBER RIBBON

BACKGROUND OF THE INVENTION

1. Field of the Invention

The present invention relates to optical fiber ribbons for optical fiber telecommunications cables. More particularly, the present invention relates to a stackable optical fiber ribbon design that provides access to one or more of the optical fibers incorporated without the use of special tools or techniques.

2. Description of the Prior Art

Optical fiber cables are now widely used in the telecommunications field to transmit information. Optical fiber cables manufacturers are frequently relying on optical fiber ribbons or multi-ribbons for high fiber count cables because they provide an organized structure which increases packing efficiency and permits rapid splicing and connectorization. Optical fiber ribbons generally comprise a plurality of optical fibers arranged in a planar array and coated with a matrix material which holds the fibers together in the planar array. Each of the optical fibers generally comprises a core, cladding, primary and secondary coatings formed from a ultraviolet light (UV) curable material and an outer color layer. In some fibers, the secondary coating contains color pigments and the outer color layer is omitted. Each of the fibers in the ribbon is given a different color so that each may be identified and distinguished from the other fibers in the ribbon.

From time to time, it is desirable to access one or more of the optical fibers in a ribbon for the purposes of splicing. Access to the optical fibers in a ribbon is generally more difficult than access to fibers loosely held in a cable because the ribbon matrix material must be removed before accessing the fibers. The removal of the ribbon matrix material must be done carefully so as not to cause damage to the delicate optical fibers. Generally, the prior art has used release agents between the optical fibers and the ribbon matrix material so that the matrix material does not adhere strongly to the optical fiber ribbons.

In the past, access to optical fibers in an optical fiber ribbon has required the use of tools and chemicals. For example, U.S. Pat. No. 5,643,393 discloses a method for accessing individual fibers in an optical fiber ribbon by securing an adhesive tape, having glue on its backing, to a substrate surface. The ribbon matrix is placed on the glue and after the glue has set, the optical fiber ribbon is pulled away from the tape to break the matrix material and delaminate one surface thereof.

U.S. Pat. No. 5,460,683 also discloses a similar method wherein a strip of adhesive tape having a plastic card element attached to one end is placed on a support surface with an adhesive surface of the strip faces upwardly. A selected span of optical fiber ribbon is placed across the exposed top surface of the tape and across the plastic card element. Glue is positioned beneath the span length of the optical fiber ribbon overlaying the plastic card element so as to bond the ribbon to a portion thereof. The end of the optical fibber ribbon overlaying the plastic card element is lifted to initiate delamination of the matrix material.

It has been found that the techniques described above can be messy and unreliable for removing the matrix material from the ribbon. Such techniques can also put too much tension on the fibers and cause damage thereto. It is desirable to have an optical fiber ribbon which does not require such methods to separate the optical fiber ribbon matrix material from the optical fibers encapsulated thereby.

SUMMARY OF THE INVENTION

It is an object of the present invention to provide an optical fiber ribbon having a fiber encapsulating matrix which can be easily removed from the optical fibers.

It is a further object of the present invention to provide a stackable optical fiber ribbon.

These objects are accomplished, at least in part, by providing an optical fiber ribbon comprising a plurality of optical fibers arranged in a parallel planar array, the planar array being further defined by first and second planar sides spanning between first and second ends. A matrix material coating envelops the optical fibers so as to bond the optical fibers together in the parallel planar array. The matrix material coating forms a first planar surface section spanning the first planar side of the planar array of optical fibers. The matrix material also forms a second planar surface section spanning the second planar side of the planar array of optical fibers. A first hinge section of matrix material bridges the first and second substantially planar surface sections at the first end of the planar array. The first hinge section has a surface portion which extends outwardly normal to and beyond at least one of the planes defined by the first and second planar surface sections of the matrix material coating. A second hinge section of matrix material bridges the first and second substantially planar surface sections at the second end of the planar array. In a preferred embodiment, the second hinge section also extends outwardly normal to and beyond at least one of the planes defined by the first and second planar surface sections.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include.

DETAILED DESCRIPTION OF THE INVENTION

Figure 1:
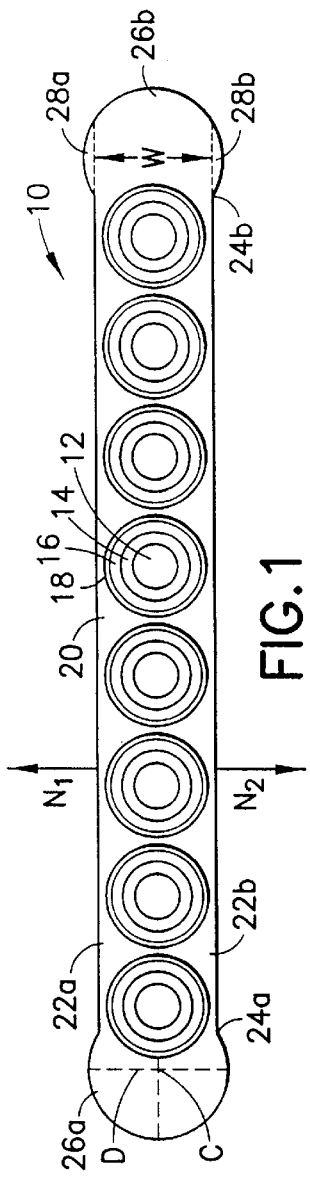
FIG. 1, which is a cross-sectional schematic diagram of one embodiment of the optical fiber ribbon of the present invention illustrating a plurality of optical fibers arranged in a planar array and encapsulated in a matrix material body having enlarged rounded hinge portions at each end.

Referring to FIG. 1, an optical fiber ribbon 10 made according to the present invention is illustrated. The optical fiber ribbon 10 illustrated has eight optical fibers arranged in a parallel planar array. Each of the fibers 12 are coated with a primary coating comprising an inner layer 14 and outer layer 16. The primary coating is overcoated with a color ink layer 18. Alternatively, the outer layer 16 may contain coloring pigments and the color layer 18 may be omitted. The fibers together with their coating layers are approximately 250 microns in diameter. A release agent may be applied to the outermost layer of the optical fiber. The planar array of optical fibers defines first and second planar sides spanning between its first and second ends.

To form a ribbon, a matrix material coating 20 is coated over the planar array of optical fibers and envelops the optical fibers bonding them together in the parallel planar array. The matrix material coating 20 forms a first substantially planar surface section 22a spanning the first planar side of the planar array of optical fibers and forms a second substantially planar surface section 22b spanning the second planar side of the planar array of optical fibers. The coating also forms hinge sections 26a, 26b bridging the first and second substantially planar surface sections 22a, 22b at the first and second ends 24a, 24b of the planar array. At least one of the hinge sections 26a, 26b has a surface portion 28a, 28b that extends outwardly beyond at least one of the planes defined by the first and second planar surface sections 22a, 22b of the matrix material coating in the direction of the normals $N_1$ or $N_2$ to such planes. Preferably, both hinge sections have a surface portion 28a, 28b that extends outwardly beyond at least one of the planes defined by the planar surface sections 22a, 22b.

FIG. 1 illustrates one preferred embodiment of the optical fiber ribbon of the present invention. In this preferred embodiment, both hinge sections, 26a, 26b are circular in cross section. The circles defining the circular cross sections have a diameter D, and the length of diameter D of such circles is greater than or equal to the width W of the matrix material between substantially planar surfaces of the planar surface sections 22a, 22b. The ratio of the diameter D to the width W is preferably in the range of about 1.2 to 1 to about 1.8 to 1. Also, the circles defining the circular cross sections of the hinge portions have a center C, and the center C is positioned outside the circumference of the optical fibers defining the ends, 24a, 24b of the planar array of optical fibers. The enlarged, circular hinge sections 26a, 26b have a surface portion 28a, 28b which extends outwardly beyond the planes defined by the substantially planar surface sections 22a, 22b in the direction which is normal $N_1$, $N_2$, to the planes.

Figure 2:
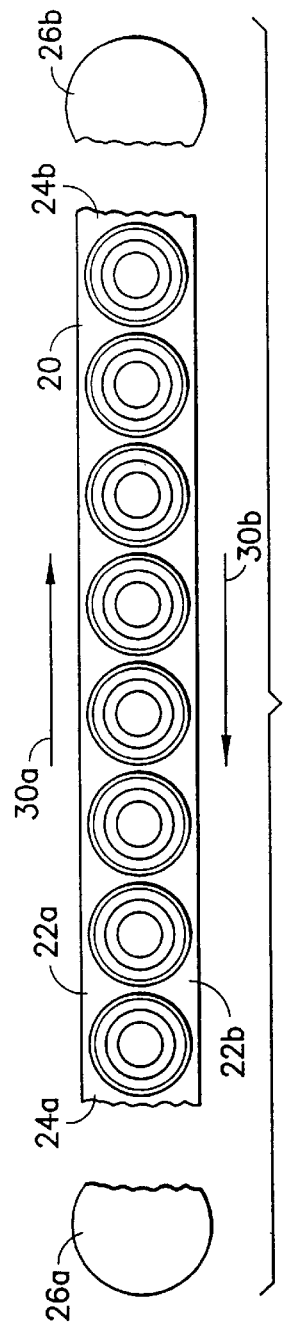
FIG. 2, which is a cross-sectional schematic diagram of the embodiment illustrated in FIG. 1 wherein the enlarged rounded hinge portions have been torn away from the matrix material.
Figure 3:
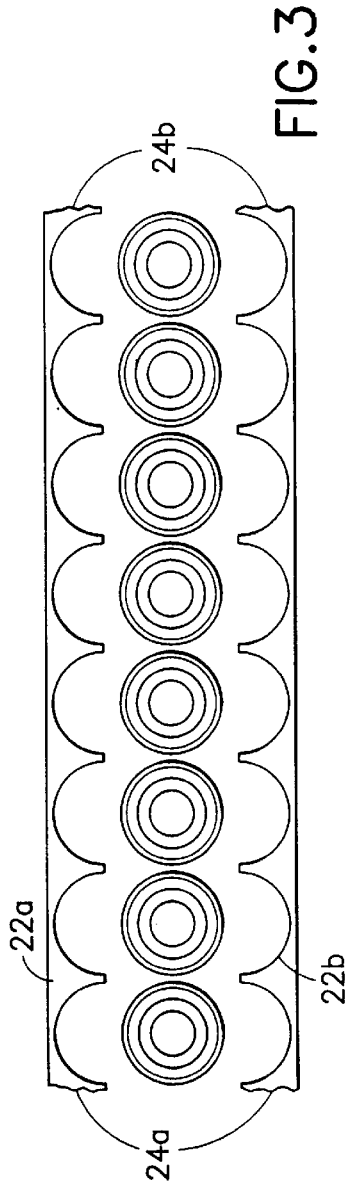
FIG. 3, which is a cross-sectional schematic diagram of the embodiment illustrated in FIG. 2 wherein the matrix material has been separated into two halves.

According to the present invention, the optical fibers in the optical fiber ribbon 10 of the present invention can be accessed without the aid of special tools. Referring to FIG. 2, access is obtained by tearing the hinge sections 26a, 26b away from the matrix material 20 bonding the planar array of optical fibers together. Once the hinge sections are removed, the matrix material coating 20 enveloping the planar optical fiber array is significantly weakened. The application of sliding forces to the substantially planar surface sections 22a, 22b in the opposing parallel planar directions generally shown by arrows 30a, 30b causes the matrix material to tear between each of the fibers. Referring to FIG. 3, once the matrix material is torn between each of the fibers, the first and second substantially planar surface sections 22a, 22b of the matrix material coating 20 may be easily removed from the optical fibers thereby enabling access thereto. All of the aforementioned steps can be accomplished by hand without tools and without placing significant strain on the delicate optical fibers because the hinge sections 26a, 26b may be grasped with the hands.

Figure 4:
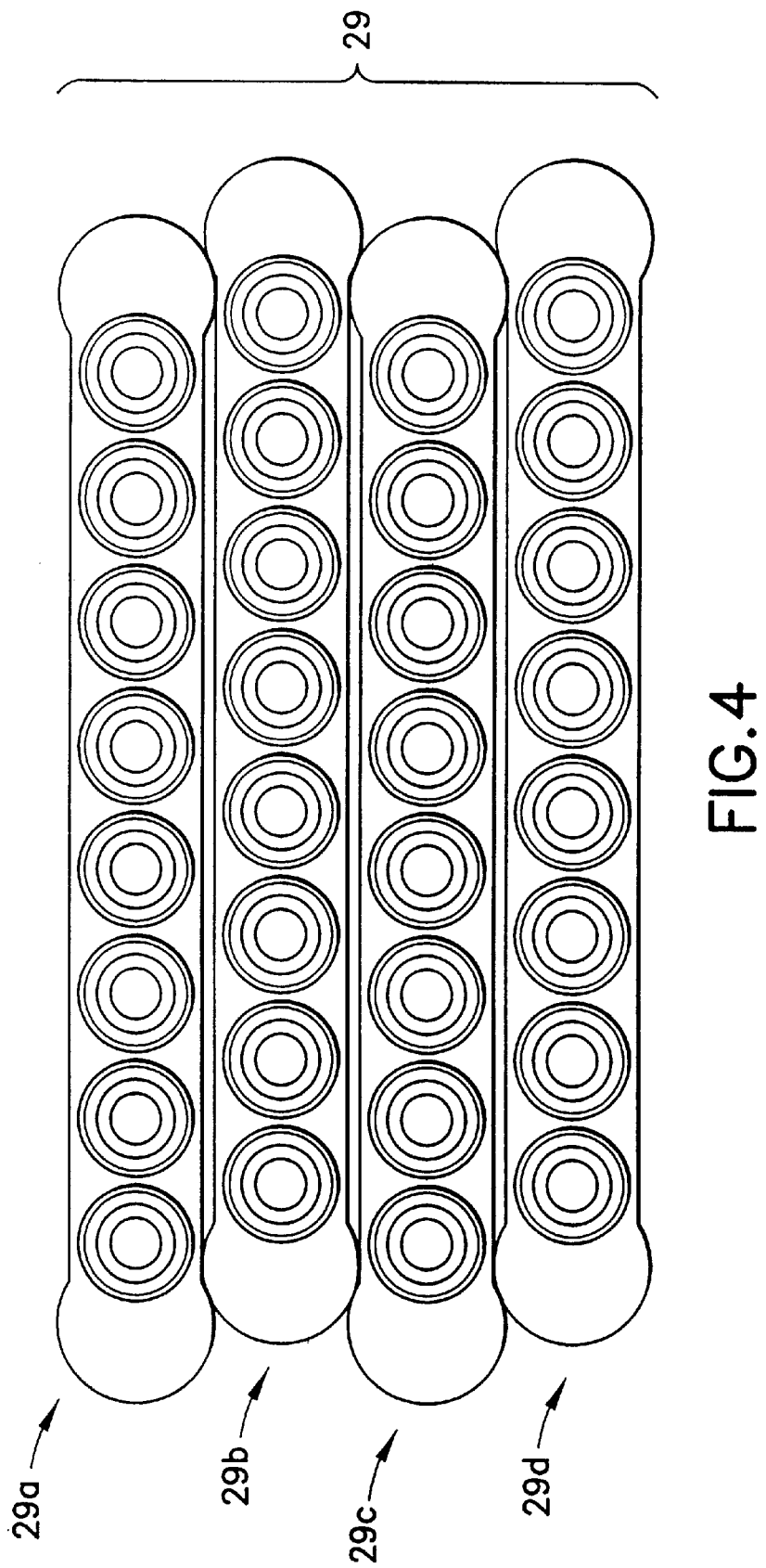
FIG. 4, which is a cross-sectional schematic diagram illustrating a stack of optical fiber ribbons made from the ribbon depicted in FIG. 1.

Referring to FIG. 4, the optical fiber ribbon embodiment illustrated in FIG. 1 can be arranged in a stack 29. Because the hinge sections 26a, 26b have circular cross sections in each of the optical fiber ribbons 29a–29d of the stack, the optical fiber ribbons may rest in an alternating offset manner to each other. The ribbons 29a–29d may be bonded to each other with an adhesive (not shown) which is placed on the surface of the hinged sections where such ribbons make contact with each other. Alternatively, a lubricant, such as silicone oil, may be applied to the surface of one or more of the ribbons to reduce adhesion between the ribbons 29a–29d, if desired.

Figure 5:
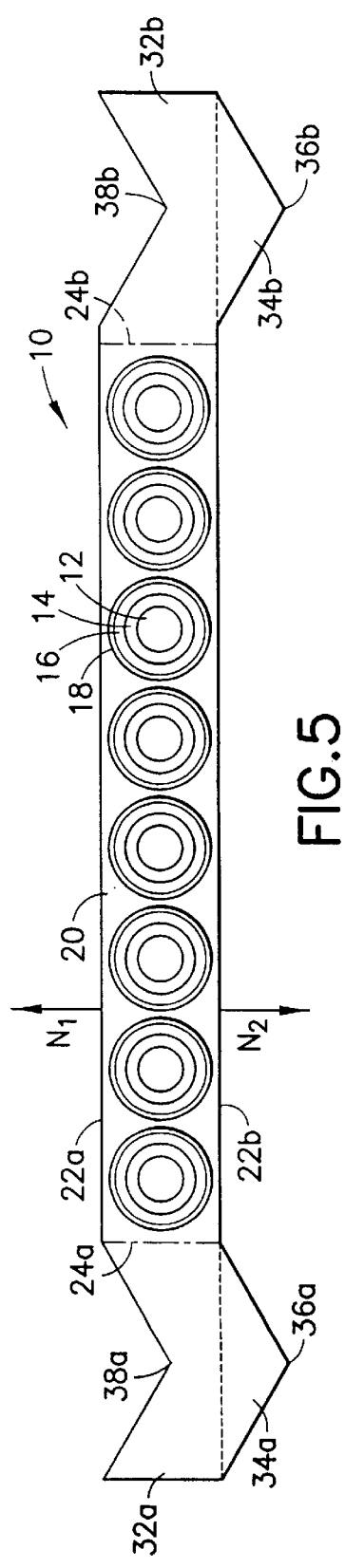
FIG. 5, which is a cross-sectional schematic diagram of an alternative embodiment of the optical fiber ribbon of the present invention in which chevron shaped hinge portions are located at each end.

An alternative embodiment of the optical fiber ribbon of the present invention is illustrated in FIG. 5. In this embodiment, the hinged sections 32a, 32b are chevron shaped. Each has an outwardly pointed ridge section 34a, 34b forming a surface portion 36a, 36b which extends outwardly beyond the plane defined by the second substantially planar surface section 22b of the matrix material coating 20. The chevron shaped hinge sections 32a, 32b also have inwardly pointed channel sections 38a, 38b which provides surface portions residing between the planes defined by the substantially planar surface sections 22a, 22b of the matrix material coating 20. While both chevron shaped hinge sections 32a, 32b are illustrated as having the ridge sections 34a, 34b extending beyond the plane defined by second planar surface section 22b in the direction of normal $N_2$, those skilled in the art will appreciate that one of the chevron shaped hinged sections may be formed so that its ridge section extends beyond the plane defined by the first planar surface section 22a in the direction of normal $N_1$.

Figure 6:
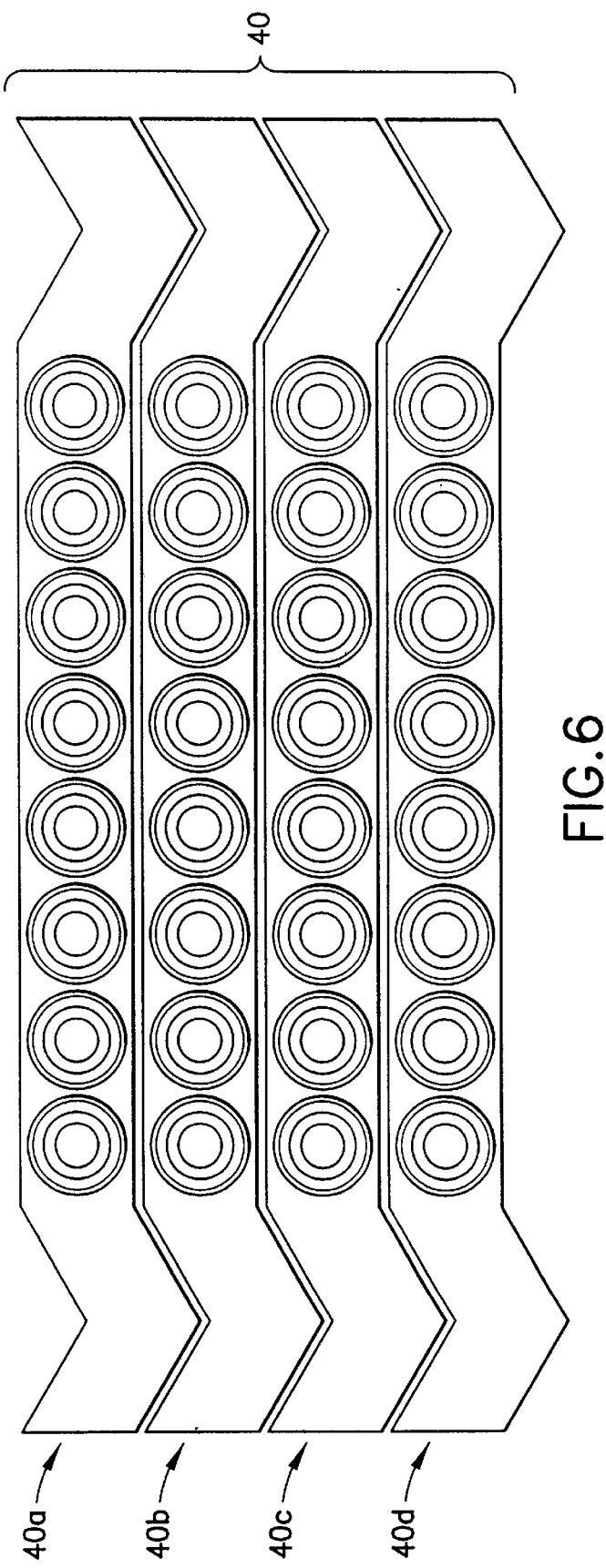
FIG. 6, which is a cross-sectional schematic diagram illustrating a stack of the optical fiber ribbons of the embodiment illustrated in FIG. 5.

As illustrated in FIG. 6, a plurality of the optical fiber ribbon illustrated in FIG. 5 can be arranged in a stack 40. As illustrated in FIG. 6, the outwardly pointed ridge section of ribbon 40a resides in the channel section of ribbon 40b. As one skilled in the art will now appreciate, the chevron shape of the hinge portion of the optical fiber ribbon prevents lateral movement of the optical fiber ribbons 40a–40d relative to each other. Adhesive may be applied to any surface of the optical fiber ribbon matrix, including the hinged sections, to bond the ribbons 40a–40d to form the stack 40, if desired. Alternatively, a lubricant may be applied to the surface of one or more ribbons 40a–40d of the stack to reduce adhesion between such ribbons.

Figure 7:
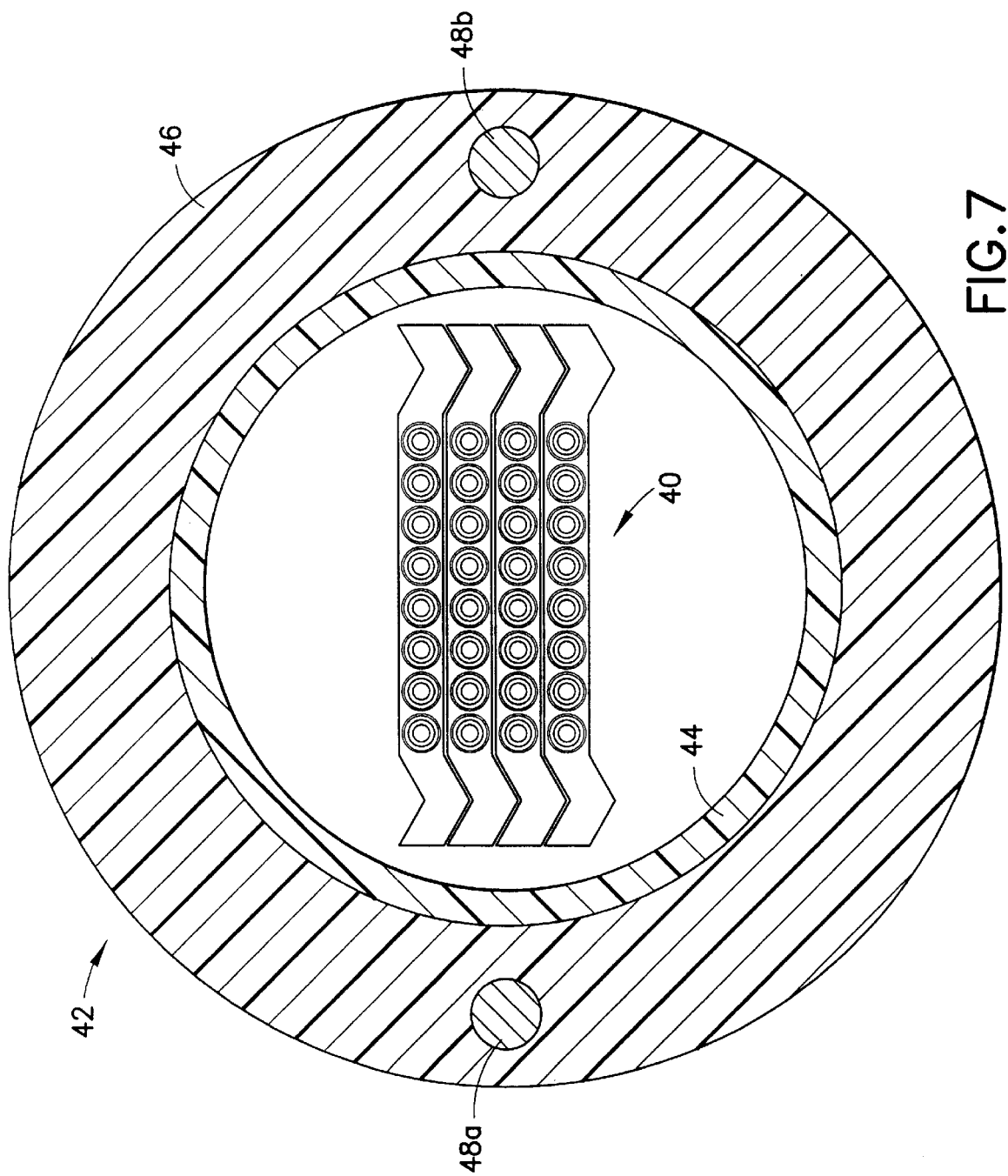
FIG. 7, which is a cross-sectional schematic diagram of an optical fiber cable containing a stack of optical fiber ribbons as illustrated in FIG. 6.

Referring to FIG. 7, a high count optical fiber cable 42 in which the optical fibers can be easily accessed without special tools can be formed by disposing an optical fiber ribbon stack, such as 40, formed with the optical fiber ribbon 10 of the present invention within a buffer tube 44 and circumscribing the buffer tube 44 with an outer jacket 46. Strength members 48a, 48b may be provided in the jacket 46 if desired. While not shown, armoring, water blocking compounds, ripcords and radial strength yarns may also be incorporated to cable in the typical fashion.

It will thus be seen that the objects and advantages set forth above and those made apparent from the preceding descriptions, are efficiently attained and, since certain changes may be made in the above construction without departing from the scope of the invention, it is intended that the matter contained in the above description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

What is claimed is:

1. An optical fiber ribbon comprising:
   a plurality of optical fibers arranged in a parallel planar array, the planar array being further defined by first and second planar sides spanning between first and second ends;
   a matrix material coating enveloping the optical fibers so as to bond the optical fibers together in the parallel planar array, the matrix material coating forming:
      a first substantially planar surface section spanning the first planar side of the planar array of optical fibers defining a first plane;
      a second planar surface section spanning the second planar side of the planar array of optical fibers defining a second plane;
      a first hinge section bridging the first and second planar surface sections at the first end of the planar array, the first hinge section having a surface portion which extends outwardly normal to and beyond at least one of the planes defined by the first and second planar surface sections of the matrix material coating; and
      a second hinge section bridging the first and second substantially planar surface sections at the second end of the planar array.

2. The optical fiber ribbon of claim 1, wherein the first hinge section is circular in cross section, wherein the circle defining the circular cross section has a diameter D, and wherein the length of diameter D is greater than the width W of the matrix material between the planes defined by the first and second substantially planar surface sections.

3. The optical fiber ribbon of claim 2, wherein the ratio of the diameter D to the width W is in the range of about 1.2 to 1 to about 1.8 to 1.

4. The optical fiber ribbon of claim 3, wherein the circle defining the circular cross section has a center C, and wherein center C is positioned outside the circumference of the optical fiber defining the first end of the planar array.

5. The optical fiber ribbon of claim 1, wherein the first hinge section is chevron shaped having an outwardly pointed ridge section forming the surface portion which extends outwardly normal to and beyond one of the planes defined by the first and second substantially planar surface sections of the matrix material coating, and further having an inwardly pointed channel section which has a surface portion residing between the planes defined by first and second planar surface sections of the matrix material coating.

6. The optical fiber ribbon of claim 1, wherein the second hinge section has a surface portion which extends outwardly normal to and beyond one of the planes defined by the first and second planar surface sections of the matrix material coating.

7. The optical fiber ribbon of claim 6, wherein the second hinge section is circular in cross section, wherein the circle defining the circular cross section has a diameter D, and wherein the length of diameter D is greater than the width W of the matrix material between the planes defined by the first and second substantially planar surface sections.

8. The optical fiber ribbon of claim 7, wherein the ratio of the diameter D to the width W is in the range of about 1.2 to 1 to about 1.8 to 1.

9. The optical fiber ribbon of claim 8, wherein the circle defining the circular cross section has a center C, and wherein center C is positioned outside the circumference of the optical fiber defining the second end of the planar array.

10. The optical fiber ribbon of claim 6, wherein the second hinge section is chevron shaped having an outwardly pointed ridge section forming the surface portion which extends outwardly normal to and beyond one of the planes defined by the first and second substantially planar surface sections of the matrix material coating, and further having an inwardly pointed channel section which has a surface portion residing between the planes defined by the first and second planar surface sections of the matrix material coating.

11. The optical fiber ribbon of claim 7, wherein the first hinge section is circular in cross section, wherein the circle defining the circular cross section has a diameter D, and wherein the length of diameter D is greater than the width W of the matrix material between the planes defined by the first and second substantially planar surface sections.

12. The optical fiber ribbon of claim 10, wherein the first hinge section is chevron shaped having an outwardly pointed ridge section forming the surface portion which extends outwardly normal to and beyond one of the planes defined by the first and second substantially planar surface sections of the matrix material coating, and further having an inwardly pointed channel section which has a surface portion residing between the planes defined by the first and second planar surface sections of the matrix material coating.

13. The optical fiber ribbon of claim 12, wherein the outwardly pointed ridge section of the first hinge section is arranged so that it extends outwardly normal from the first plane defined by the first substantially planar surface section of the matrix material coating and wherein the outwardly pointed ridge section of the second hinge section is arranged so that it extends outwardly normal from the second plane defined by the second substantially planar surface section of the matrix material coating.

14. The optical fiber ribbon of claim 12, wherein the outwardly pointed ridge section of the first hinge section is arranged so that it extends outwardly normal from the first plane defined by the first substantially planar surface section of the matrix material coating and wherein the outwardly pointed ridge section of the second hinge section is arranged so that it extends outwardly from the first plane defined by the first substantially planar surface section of the matrix material coating.

15. An optical fiber cable comprising:
   a buffer tube;
   an optical fiber ribbon disposed within the buffer tube, the optical fiber ribbon further comprising:
      a plurality of optical fibers arranged in a parallel planar array, the planar array being further defined by first and second planar sides spanning between first and second ends;
      a matrix material coating enveloping the optical fibers so as to bond the optical fibers together in the parallel planar array, the matrix material coating forming:
         a first substantially planar surface section spanning the first planar side of the planar array of optical fibers defining a first plane;
         a second substantially planar surface section spanning the second planar side of the planar array of optical fibers defining a second plane;
         a first hinge section bridging the first and second substantially planar surface sections at the first end of the planar array, the first hinge section having a surface portion which extends outwardly normal to and beyond at least one of the planes defined by the first and second planar surface sections of the matrix material coating; and
         a second hinge section bridging the first and second substantially planar surface sections at the second end of the planar array; and
   a jacket circumscribing the buffer tube.

16. The optical fiber cable of claim 15, wherein the first hinge section is circular in cross section, wherein the circle defining the circular cross section has a diameter D, and wherein the length of diameter D is greater than the width W of the matrix material between the planes defined by the first and second substantially planar surface sections.

17. The optical fiber cable of claim 16, wherein the ratio of the diameter D to the width W is in the range of about 1.2 to 1 to about 1.8 to 1.

18. The optical fiber cable of claim 17, wherein the circle defining the circular cross section has a center C, and wherein center C is positioned outside the circumference of the optical fiber defining the first end of the planar array.

19. The optical fiber cable of claim 15, wherein the first hinge section is chevron shaped having an outwardly pointed ridge section forming the surface portion which extends outwardly normal to and beyond one of the planes defined by the first and second substantially planar surface sections of the matrix material coating, and further having an inwardly pointed channel section which has a surface portion residing between the planes defined by the first and second planar surface sections of the matrix material coating.

20. The optical fiber cable of claim 15, wherein the second hinge section has a surface portion which extends outwardly normal to and beyond one of the planes defined by the first and second planar surface sections of the matrix material coating.

21. The optical fiber cable of claim 20, wherein the second hinge section is circular in cross section, wherein the circle defining the circular cross section has a diameter D, and wherein the length of diameter D is greater than the width W of the matrix material between the planes defined by the first and second substantially planar surface sections.

22. The optical fiber cable of claim 21, wherein the ratio of the diameter D to the width W is in the range of about 1.2 to 1 to about 1.8 to 1.

23. The optical fiber cable of claim 22, wherein the circle defining the circular cross section has a center C, and wherein center C is positioned outside the circumference of the optical fiber defining the second end of the planar array.

24. The optical fiber cable of claim 20, wherein the second hinge section is chevron shaped having an outwardly pointed ridge section forming the surface portion which extends outwardly normal to and beyond one of the planes defined by the first and second substantially planar surface sections of the matrix material coating, and further having an inwardly pointed channel section which has a surface portion residing between the planes defined by the first and second planar surface sections of the matrix material coating.

25. The optical fiber cable of claim 21, wherein the first hinge section is circular in cross section, wherein the circle defining the circular cross section has a diameter D, and wherein the length of diameter D is greater than the width W of the matrix material between the planes defined by the first and second substantially planar surface sections.

26. The optical fiber cable of claim 24, wherein the first hinge section is chevron shaped having an outwardly pointed ridge section forming the surface portion which extends outwardly normal to and beyond one of the planes defined by the first and second substantially planar surface sections of the matrix material coating, and further having an inwardly pointed channel section which has a surface portion residing between the planes defined by the first and second planar surface sections of the matrix material coating.

27. The optical fiber cable of claim 26, wherein the outwardly pointed ridge section of the first hinge section is arranged so that it extends outwardly normal from the first plane defined by the first substantially planar surface section of the matrix material coating and wherein the outwardly pointed ridge section of the second hinge section is arranged so that it extends outwardly from the second plane defined by the second substantially planar surface section of the matrix material coating.

28. The optical fiber cable of claim 26, wherein the outwardly pointed ridge section of the first hinge section is arranged so that it extends outwardly normal from the first plane defined by the first substantially planar surface section of the matrix material coating and wherein the outwardly pointed ridge section of the second hinge section is arranged so that it extends outwardly from the first plane defined by the first substantially planar surface section of the matrix material coating.

29. The optical fiber cable of claim 15, wherein a plurality of optical fiber ribbons forming a stack are disposed within the buffer tube.

30. The optical fiber cable of claim 29, wherein the matrix material coatings of the plurality of optical fiber ribbons are bonded together.

31. The optical fiber cable of claim 29, wherein a lubricant is applied to the matrix material coating of at least one optical fiber ribbon of the plurality to reduce adhesion between the ribbon and other ribbons of the plurality.

\* \* \* \* \*